United States Patent
Goh

(10) Patent No.: US 9,221,464 B2
(45) Date of Patent: Dec. 29, 2015

(54) METHOD AND SYSTEM FOR CONTROLLING IDLE STOP OF VEHICLE

(71) Applicants: Hyundai Motor Company, Seoul (KR); Kia Motors Corporation, Seoul (KR)

(72) Inventor: Sang Bum Goh, Suwon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 85 days.

(21) Appl. No.: 13/709,935

(22) Filed: Dec. 10, 2012

(65) Prior Publication Data

US 2014/0045655 A1    Feb. 13, 2014

(30) Foreign Application Priority Data

Aug. 7, 2012  (KR) .................. 10-2012-0086379

(51) Int. Cl.
| | |
|---|---|
| *B60W 10/00* | (2006.01) |
| *B60W 30/18* | (2012.01) |
| *B60W 10/04* | (2006.01) |
| *B60W 10/192* | (2012.01) |
| *F02N 11/08* | (2006.01) |

(52) U.S. Cl.
CPC ......... *B60W 30/18018* (2013.01); *B60W 10/04* (2013.01); *B60W 10/192* (2013.01); *F02N 11/0833* (2013.01); *B60W 2510/184* (2013.01); *B60Y 2300/45* (2013.01); *F02N 11/0822* (2013.01); *F02N 2200/08* (2013.01); *F02N 2200/0801* (2013.01); *F02N 2200/102* (2013.01); *Y02T 10/48* (2013.01); *Y10T 477/813* (2015.01)

(58) Field of Classification Search
CPC ............... B60W 30/18018; B60W 10/192; B60W 10/04; B60W 2510/184; B60W 2300/45; F02N 11/0833; F02N 11/0822; F02N 2200/0801; F02N 2200/102; F02N 2200/08
USPC ......... 477/93, 92, 97, 98, 114, 170, 166, 171, 477/173, 71, 180, 174, 3, 5, 179, 181; 475/5, 3; 701/22, 67, 68; 180/65.265
See application file for complete search history.

(56) References Cited

U.S. PATENT DOCUMENTS

| | | | | |
|---|---|---|---|---|
| 5,662,553 | A  * | 9/1997 | Reichlinger ................ | 477/179 |
| 7,247,123 | B2 * | 7/2007 | Ohtake et al. ................ | 477/98 |
| 7,356,400 | B2 * | 4/2008 | Honma et al. ................ | 701/67 |
| 8,206,263 | B2 * | 6/2012 | Tsuchikawa ................ | 477/71 |
| 2012/0330522 | A1 * | 12/2012 | Gibson et al. ................ | 701/70 |
| 2014/0136039 | A1 * | 5/2014 | Tanishima et al. ............ | 701/22 |

FOREIGN PATENT DOCUMENTS

| | | |
|---|---|---|
| JP | 4192124 B2 | 12/2008 |
| JP | 2011-143868 | 7/2011 |
| KR | 10-2012-0002340 A | 1/2012 |

* cited by examiner

*Primary Examiner* — David J Hlavka
(74) *Attorney, Agent, or Firm* — Morgan, Lewis & Bockius LLP

(57) ABSTRACT

A method and a system for controlling idle stop of a vehicle that can reduce braking noise and prevent startup delay may be included, wherein the method for controlling may include estimating a disk temperature, determining whether the estimated disk temperature may be lower than or equal to a first predetermined temperature, and prohibiting engine stop according to the idle stop when the estimated disk temperature may be higher than the first predetermined temperature.

11 Claims, 5 Drawing Sheets

METHOD AND SYSTEM FOR CONTROLLING IDLE STOP OF VEHICLE

CROSS-REFERENCE TO RELATED APPLICATION

The present application claims priority to Korean Patent Application No. 10-2012-0086379 filed in the Korean Intellectual Property Office on Aug. 7, 2012, the entire contents of which is incorporated herein for all purposes by this reference.

BACKGROUND OF THE INVENTION

1. Field of the Invention

The present invention relates to a method and a system for controlling idle stop of a vehicle, and more particularly to a method and a system for controlling idle stop of a vehicle that can reduce braking noise and prevent startup delay.

2. Description of Related Art

Recently, researches for improving fuel economy and reducing exhaust gas have been vividly developed due to energy depletion and environmental pollution. An idle stop and go (ISG) system is developed so as to enhance fuel economy and reduce exhaust gas.

According to the ISG system, an engine is stopped when a vehicle stops and the engine is restarted when the vehicle begins to run. When the engine is restarted, however, an engine speed is raised in a moment and is lowered. After that, the engine speed is stably maintained. At this time, torque is changed quickly and stumble may occur. Recently, an electric stability control system is used so as to prevent occurrence of stumble. The electric stability control system delays start of the vehicle for a predetermined time when the engine is restarted.

If the start of the vehicle is delayed by using the electric stability control system, however, braking noise may occur. In further detail, the electric stability control system brakes the vehicle when the engine speed increases on restarting of the engine. If the engine speed decreases at this state, momentary vibration may occur at a wheel due to change in driving torque. Particularly, since the electric stability control system releases braking force of the vehicle if the engine speed decreases, braking noise may occur at a point when the braking force is equal to the driving torque. If braking time of the vehicle by the electric stability control system is extended, occurrence of such noise can be prevented. However, the start of the vehicle may be excessively delayed.

Meanwhile, the braking noise further increases if a disk temperature is raised by sequential braking before the vehicle stops or by quick braking.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system for controlling idle stop of a vehicle having advantages of prohibiting engine stop according to the idle stop if a disk temperature is higher than a predetermined temperature.

In an aspect of the present invention, a method for controlling idle stop of a vehicle may include estimating a disk temperature, determining whether the estimated disk temperature is lower than or equal to a first predetermined temperature, and prohibiting engine stop according to the idle stop when the estimated disk temperature is higher than the first predetermined temperature.

The estimation of the disk temperature is determined based on work done by braking force.

The estimation of the disk temperature may include determining the work done by the braking force for a unit time, determining work distributed to one disk among the work done by the braking force, converting the work distributed to the one disk into heat, determining a temperature rise of the one disk, and determining the disk temperature based on the temperature rise of the one disk.

The determining the disk temperature based on the temperature rise of the one disk is performed by adding temperature rises of the disk for n unit times, and the n is integer larger than or equal to 1.

The method mat may further include determining whether an engine stop condition according to the idle stop is satisfied, wherein an engine is stopped according to the idle stop when the engine stop condition is satisfied and the estimated disk temperature is lower than or equal to the first predetermined temperature.

When the estimated disk temperature is higher than the first predetermined temperature, the engine stop according to the idle stop is prohibited.

When the estimated disk temperature is lower than or equal to a second predetermined temperature, the estimating the disk temperature is repeated.

When the estimated disk temperature is higher than the second predetermined temperature, the engine stop accordion to the idle stop is continuously prohibited.

The method may further include determining whether an engine restart condition is satisfied after the engine is stopped, and restarting the engine when the engine restart condition is satisfied.

The method may further include determining whether an operation of an electric brake system is needed when the engine is restarted, and operating the electric brake system when the operation of the electric brake system is needed.

The operated electric brake system is released when a predetermined condition is satisfied.

In another aspect of the present invention, a system for controlling idle stop of a vehicle may include a speed sensor for detecting a vehicle speed, a brake pedal position sensor for detecting operation of a brake, and a controller for controlling the idle stop and restart of the vehicle based on detected values by the speed sensor and the brake pedal position sensor, wherein the controller estimates a disk temperature based on the detected values by the speed sensor and the brake pedal position sensor, and prohibits engine stop according to the idle stop when the estimated disk temperature is higher than or equal to a first predetermined temperature.

The controller determines work distributed to one disk from work done by braking force for a unit time, determines a temperature rise of the one disk by converting the work distributed to the one disk into heat, and determines the disk temperature based on the temperature rise of the one disk.

The controller determines the disk temperature by adding temperature rises of the disk for n unit times, and the n is integer larger than or equal to 1.

The controller determines whether an engine stop condition according to the idle stop is satisfied, and stops an engine when the engine stop condition is satisfied and the estimated disk temperature is lower than or equal to the first predetermined temperature.

When the estimated disk temperature is higher than the first predetermined temperature, the engine stop according to the idle stop is prohibited.

When the estimated disk temperature is lower than or equal to a second predetermined temperature, the controller repeats estimating the disk temperature.

The controller restarts the engine when an engine restart condition is satisfied after the engine is stopped.

The system may further include an electric brake system for braking the vehicle, wherein the controller operates an electric brake system until a predetermined condition is satisfied when the engine is restarted.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
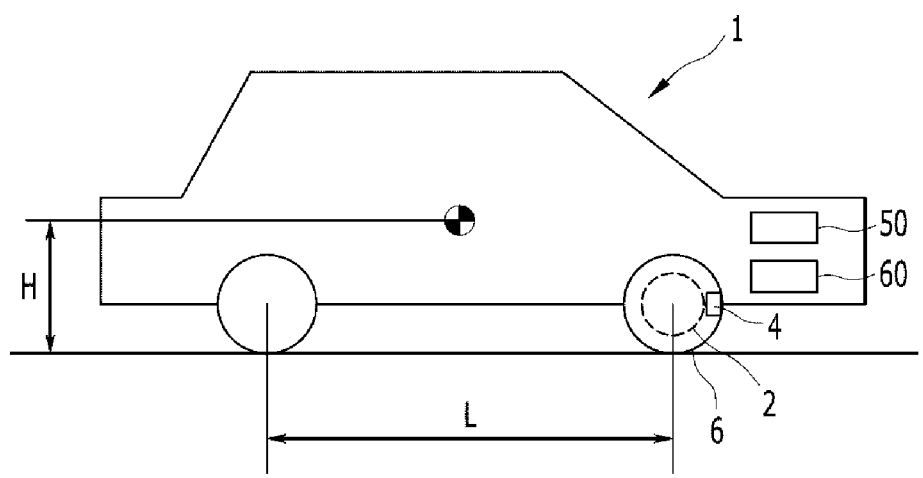
FIG. 1 is a schematic diagram of a vehicle at which a system for controlling idle stop according to an exemplary embodiment of the present invention is mounted.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of a vehicle at which a system for controlling idle stop according to an exemplary embodiment of the present invention is mounted.

As shown in FIG. 1, a vehicle 1 includes an engine 70 (please refer to FIG. 2) as a power source, and rotates a wheel 6 using power generated at the engine 70. A brake apparatus 4 is mounted at the wheel 6 and brakes the vehicle 1 by hindering rotation of a disk 2 fixed to the wheel 6 by frictional force.

In addition, an idle stop and go (ISG) system 50 and an electric brake system 60 are mounted at the vehicle 1.

The ISG system 50 stops the engine 70 if the vehicle stops and restarts the engine 70 if the vehicle starts. The ISG system 50 is well known to a person of an ordinary skill in the art and accordingly detailed description thereof will be omitted.

The electric brake system 60, independent of an operation of a brake pedal, brakes the vehicle 1. That is, the electric brake system 60 generates hydraulic pressure applied to a brake piston and brakes the vehicle 1 without the operation of the brake pedal if a predetermined condition is satisfied. The electric brake system 60 may be included in an electric stability control system mounted at the vehicle 1 or may be mounted at the vehicle 1 independent of the electric stability control system.

Meanwhile, the vehicle 1 may be any type of vehicles at which the ISG system 50 and the electric brake system 60 are mounted such as a gasoline vehicle, a diesel vehicle, a hybrid vehicle, and so on.

Figure 2:
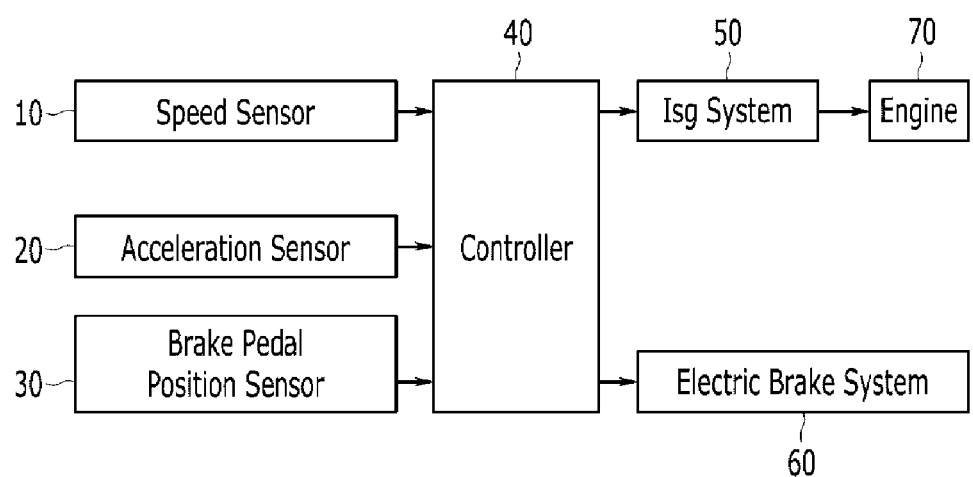
FIG. 2 is a block diagram of a system for controlling idle stop according to an exemplary embodiment of the present invention.

FIG. 2 is a block diagram of a system for controlling idle stop according to an exemplary embodiment of the present invention.

As shown in FIG. 2, a system for controlling idle stop according to an exemplary embodiment of the present invention includes a speed sensor 10, an acceleration sensor 20, a brake pedal position sensor 30, a controller 40, the ISG system 50, and the electric brake system 60.

The speed sensor 10 detects a speed of the vehicle 1 and transmits a signal corresponding thereto to the controller 40. The speed sensor 10 may be an ABS sensor mounted at the wheel 6 of the vehicle 1.

The acceleration sensor 20 detects an acceleration of the vehicle 1 and transmits a signal corresponding thereto to the controller 40. The acceleration sensor 20 and the speed sensor 10 may be mounted respectively. On the contrary, the acceleration of the vehicle 1 may be calculated based on the speed of the vehicle 1 detected by the speed sensor 10.

The brake pedal position sensor 30 detects an operation of a brake and transmits a signal corresponding thereto to the controller 40. The signal of the brake pedal position sensor 30 is 1 if the brake is operated, but the signal of the brake pedal position sensor 30 is 0 if the brake is not operated.

The controller 40 is electrically connected to the speed sensor 10, the acceleration sensor 20, and the brake pedal position sensor 30, and receives electrical signals corresponding to values detected by the sensors. The controller 40 can be realized by one or more processors activated by a predetermined program, and the predetermined program can be programmed to perform each step of a method for controlling idle stop of a vehicle according to an exemplary embodiment of the present invention.

The controller 40 controls operations of the ISG system 50 and the electric brake system 60 based on the electrical signals transmitted from the sensors.

A method for controlling idle stop according to an exemplary embodiment of the present invention will hereinafter be described in detail.

Figure 3:
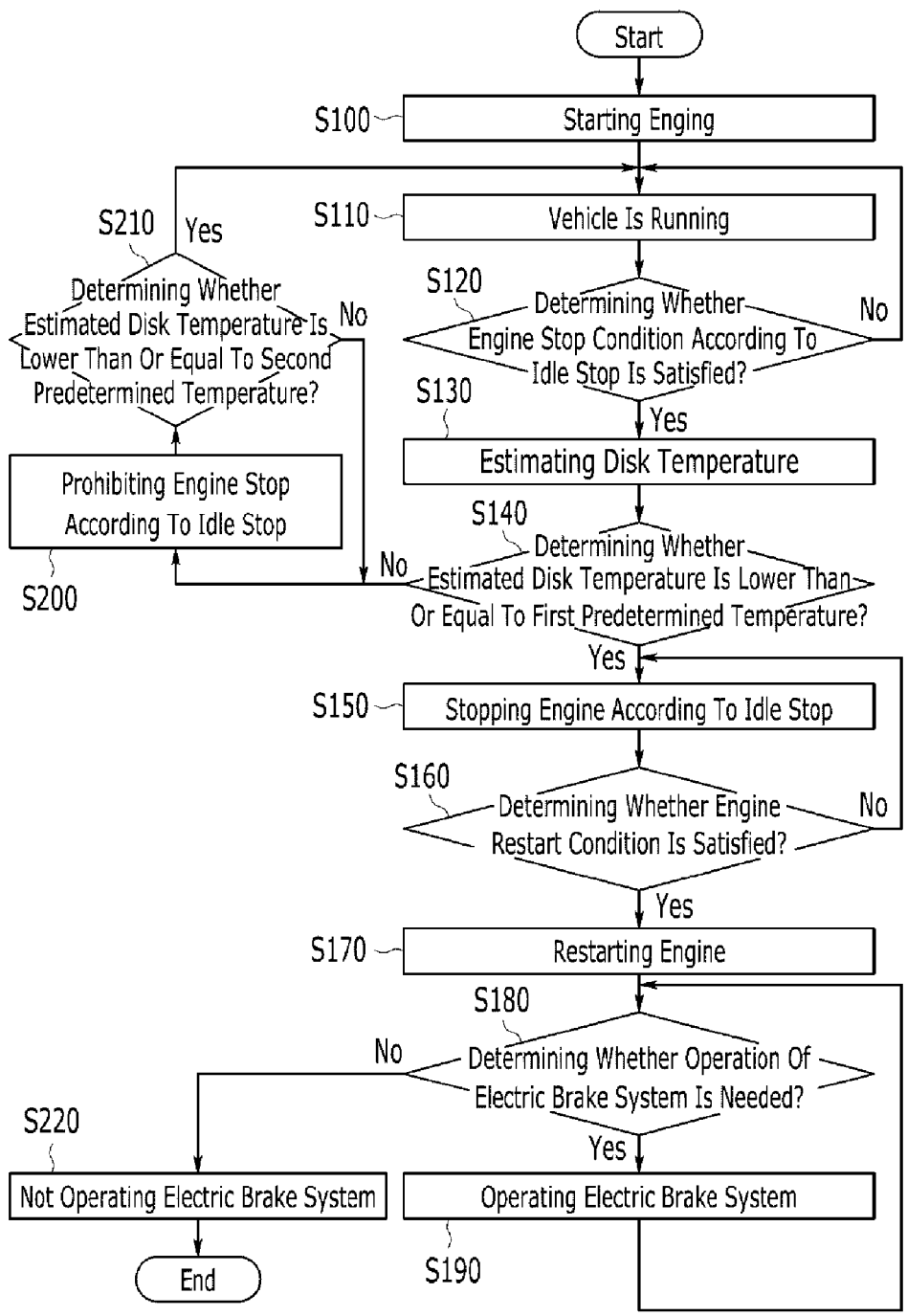
FIG. 3 is a flowchart of a method for controlling idle stop according to an exemplary embodiment of the present invention.

FIG. 3 is a flowchart of a method for controlling idle stop according to an exemplary embodiment of the present invention.

If the engine 70 is started at step S100, the vehicle 1 runs according to manipulations of a driver at step S110. The control portion 40 determines whether an engine stop condition according to the idle stop is satisfied at step S120. The engine stop condition according to the idle stop may be satisfied if the vehicle is stopped, the brake pedal is operated, a brake pressure is higher than or equal to a predetermined pressure, charge amount of a battery is higher than or equal to a predetermined charge amount. The engine stop condition is not limited to the above-mentioned condition and may include any suitable condition.

If the engine stop condition according to the idle stop is not satisfied at the step S120, the controller 40 returns to the step S110. If the engine stop condition according to the idle stop is satisfied at the step S120, the controller 40 estimates a disk temperature at step S130.

Estimation of the disk temperature will be described in further detail with reference to FIG. 4 and FIG. 5.

Figure 4:
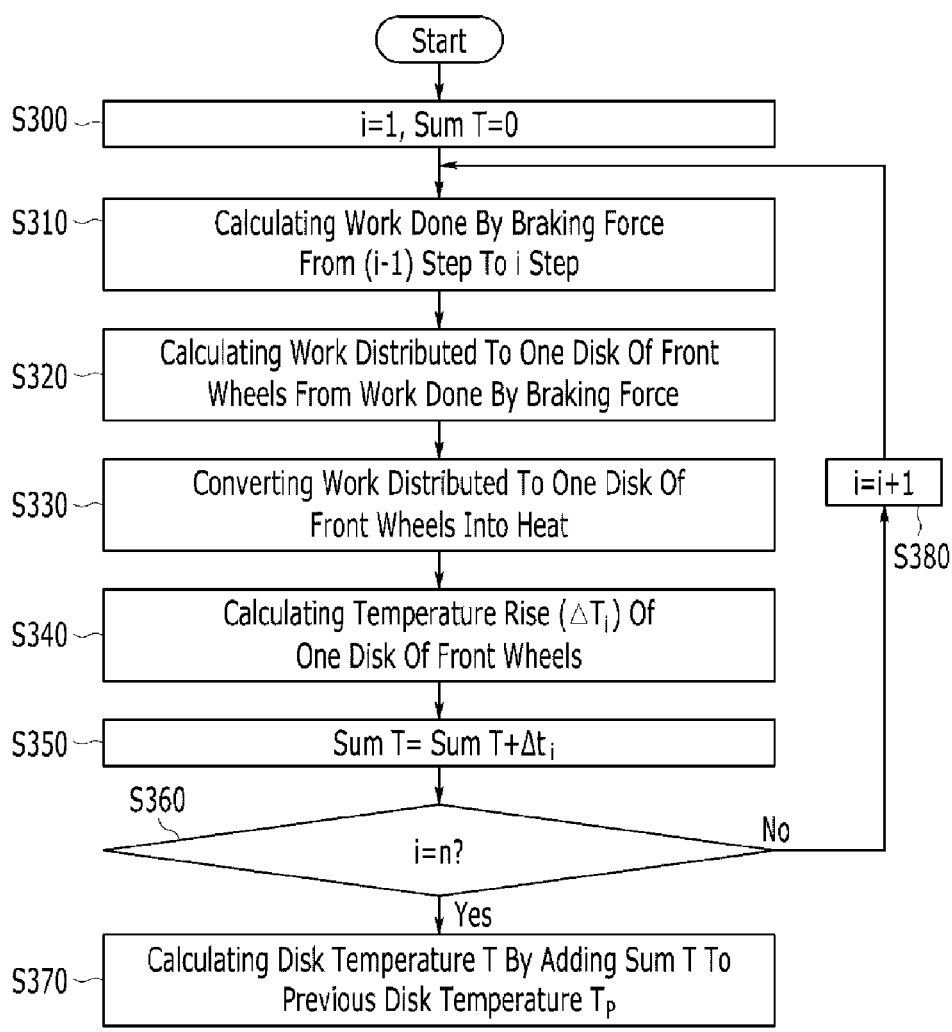
FIG. 4 is a flowchart of a method for estimating a disk temperature according to an exemplary embodiment of the present invention.
Figure 5:
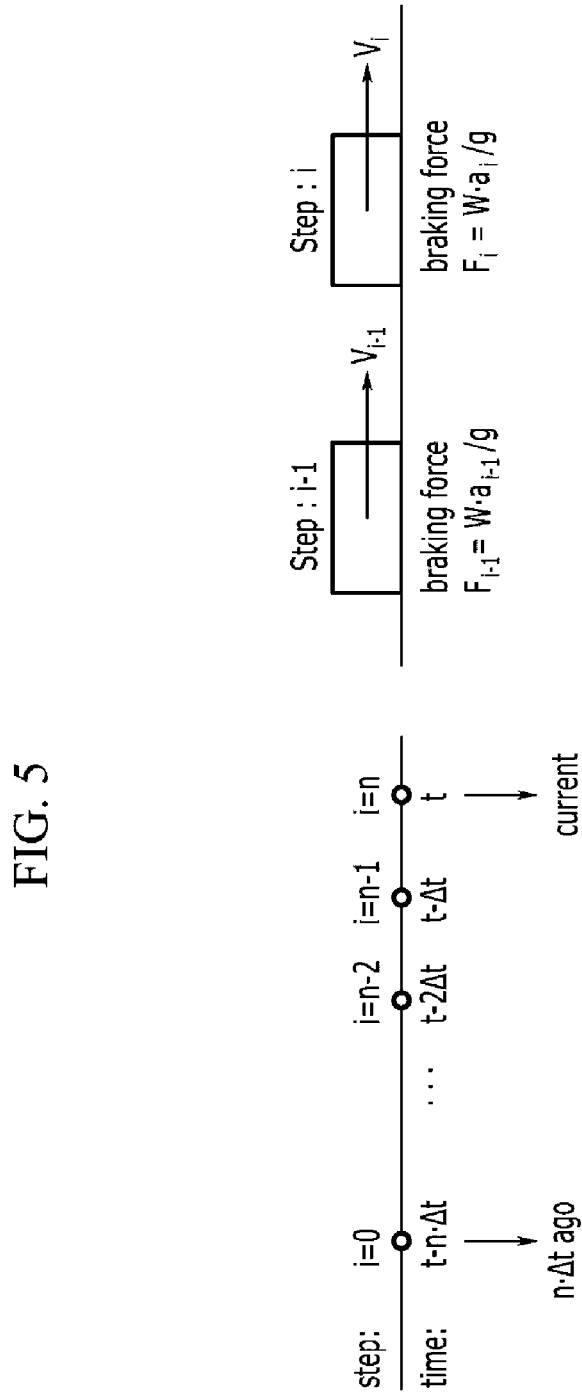
FIG. 5 is a schematic diagram for explaining a method for estimating a disk temperature according to an exemplary embodiment of the present invention.

FIG. 4 is a flowchart of a method for estimating a disk temperature according to an exemplary embodiment of the present invention, and FIG. 5 is a schematic diagram for explaining a method for estimating a disk temperature according to an exemplary embodiment of the present invention.

As shown in FIG. 5, a temperature change (sumT) of the disk for a predetermined time (n*Δt) is calculated so as to estimate the disk temperature T, and the predetermined time is divided into n unit times (Δt). According to an exemplary embodiment of the present invention, a temperature rise ΔT of the disk for the unit time is calculated, the temperature change (sumT) of the disk is calculated by adding the temperature rises ΔT of the disk, and the disk temperature T is calculated by adding the temperature change (sumT) of the disk to a previous disk temperature $T_P$.

In addition, work for unit time (Δt) done by braking force is calculated so as to calculate the disk temperature rise ΔT.

As shown in FIG. 4, the controller 40 substitutes 1 into i and substitutes 0 into the temperature change (sumT) of the disk before performing estimation of the disk temperature at step S300. Herein, i means step number.

After that, the controller 40 calculates work ($\Delta E_i$) done by the braking force from (i−1) step to i step at step S310. The work ($\Delta E_i$) done by the braking force from (i−1) step to i step is calculated from the following equation.

$$\Delta E_i = -B_i \cdot \frac{W}{2g}(a_i + a_{i-1}) \cdot \frac{(V_i + V_{i-1})}{2} \cdot \Delta t$$

Herein, $B_i$ represents the signal of the brake pedal position sensor 30, W represents a load of the vehicle, g represents acceleration of gravity, $a_i$ represents acceleration at i step, and $V_i$ represents the vehicle speed at i step. As described above, B, may be 0 or 1.

After the work ($\Delta E_i$) done by the braking force from (i−1) step to i step is calculated, the controller 40 calculates work ($\Delta E_{i,Front/2}$) distributed to one disk 2 of front wheels at step S320. The work ($\Delta E_{i,Front/2}$) distributed to the one disk 2 of the front wheels is calculated from the following equation.

$$\Delta E_{i,Front/2} = \left(R - \frac{H}{L} \cdot \frac{a_i}{g}\right) \cdot \frac{\Delta E_i}{2}$$

Herein, L represents a wheel base (please see FIG. 1), H represents a height of mass center of the vehicle (please see FIG. 1), and R represents static load distribution ratio.

The work distributed to the one disk 2 of the front wheels is calculated in an exemplary embodiment of the present invention, but the present invention is not limited to this. That is, work distributed to one disk of rear wheels or the work distributed to the one disk 2 of the front wheels and the work distributed to the one disk of the rear wheels can be calculated.

The controller 40 converts the work ($\Delta E_{i,Front/2}$) distributed to the one disk 2 of the front wheels into heat ($Q_{i,Front/2}$) at step S330. The work ($\Delta E_{i,Front/2}$) distributed to the one disk 2 of the front wheels is converted into the heat through the following equation.

$$Q_{i,Front/2} = A \cdot \Delta E_{i,Front/2}$$

Herein, A represents thermal equivalent of work.

After that, the controller 40 calculates a temperature rise (ΔTi) of the one disk 2 of the front wheels at step S340. The temperature rise (ΔTi) of the one disk 2 of the front wheels is calculated from the following equation.

$$\Delta T_i = \frac{Q_{i,Front/2}}{\rho c v}$$

Herein, ρ represents a density of the disk, c represents a specific heat of the disk, and v represents a volume of a friction surface of the disk.

After that, the controller 40 calculates the temperature change (sumT) of the disk to i step by adding the temperature rise (ΔTi) of the one disk 2 of the front wheels to the temperature change (sumT) of the disk to (i−1) step at step S350.

After that, the controller 40 determines whether i equals to n at step S360. Herein, n is number of unit times and is integer larger than or equal to 1.

If i is smaller than n, the controller 40 adds 1 to I and returns to the step S310.

If i equals to n, the controller 40 calculates the disk temperature T by adding the temperature change (sumT) of the disk to the previous disk temperature $T_P$ at step S370. Herein, the previous disk temperature $T_P$ may be the disk temperature calculated previously or a room temperature. If the brake is not operated for a long time, the previous disk temperature is the room temperature. If the brake, on the contrary, is operated frequently, the disk temperature may be calculated when the brake operates and may be used as the disk temperature calculated previously. In this case, cooling effect of the disk for a time when the brake is not operated may be taken into consideration.

If the disk temperature is estimated at the step S130, the controller 40 determines whether the estimated disk temperature is lower than or equal to a first predetermined temperature at step S140. Herein, the first predetermined temperature may be a temperature within a range of 50° C.-300° C.

If the disk temperature is higher than the first predetermined temperature, the controller 40 prohibits engine stop according to idle stop at step S200. That is, because it is possible that braking noise can occur due to high disk temperature, the controller 40 prevents the ISG system 50 from entering an engine stop mode.

In addition, the controller 40 determines whether the estimated disk temperature is lower than or equal to a second predetermined temperature at step S210. Herein, the second predetermined temperature may be equal to the first predetermined temperature or not. The second predetermined temperature is used for preventing that the ISG system 50 cannot enter the engine stop mode due to a wrongly estimated disk temperature.

If the estimated disk temperature is lower than or equal to the second predetermined temperature at the step S210, the controller 40 returns to the step S110.

If the estimated disk temperature is higher than the second predetermined temperature at the step S210, the controller 40 continuously prohibits the engine stop according to the idle stop at the step S200.

Meanwhile, if the estimated disk temperature is lower than or equal to the first predetermined temperature at the step S140, the controller 40 executes the engine stop according to the idle stop at step S150. That is, the controller 40 controls the ISG system 50 to enter an engine stop mode.

In a state that the engine is stopped, the controller 40 determines whether an engine restart condition is satisfied at step S160. The engine restart condition may be satisfied if the brake pedal does not operate or shift range is changed. The engine restart condition is not limited to the above-described conditions and can include any suitable conditions.

If the engine restart condition is not satisfied, the controller 40 returns to the step S150.

If the engine restart condition is satisfied, the controller 40 restarts the engine 70. That is, the controller 40 controls the ISG system 50 to restart the engine 70.

When the engine 70 is restarted, the controller 40 determines whether an operation of the electric brake system 60 is needed. The operation of the electric brake system 60 is determined to be needed if a predetermined time has not passed since the engine 70 was restarted. The predetermined time may be, but is not limited to, 1 second.

If it is determined at the step S180 that the operation of the electric brake system 60 is needed, the controller 40 operates the electric brake system 60. That is, the electric brake system 60 is controlled to generate hydraulic pressure for braking.

If it is determined at the step S180 that the operation of the electric brake system 60 is not needed (i.e., it is determined that the predetermined time has passed since the engine 70 was restarted), the controller 40 stops the electric brake system 60. That is, the hydraulic pressure generated by the electric brake system 60 is released.

As described above, because the engine stop according to the idle stop is prohibited if the disk temperature is higher than or equal to a predetermined temperature according to an exemplary embodiment of the present invention, occurrence of braking noise may be prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling idle stop of a vehicle, comprising:
    estimating a disk temperature of a brake disk by a controller based on detected values of a speed sensor and a brake pedal position sensor, before stopping an engine according to the idle stop;
    determining, before stopping the engine according to the idle stop, by the controller, whether the estimated disk temperature of the brake disk is lower than or equal to a first predetermined temperature; and
    prohibiting by the controller, the engine from being at engine stop according to the idle stop when the estimated disk temperature of the brake disk is higher than the first predetermined temperature.

2. The method of claim 1, wherein the estimation of the disk temperature is determined based on work done by braking force.

3. The method of claim 2, wherein the estimation of the disk temperature includes:
    determining the work done by the braking force for a unit time;
    determining work distributed to one disk among the work done by the braking force;
    converting the work distributed to the one disk into heat;
    determining a temperature rise of the one disk; and
    determining the disk temperature based on the temperature rise of the one disk.

4. The method of claim 3, wherein the determining the disk temperature based on the temperature rise of the one disk is performed by adding temperature rises of the disk for n unit times, and the n is integer larger than or equal to 1.

5. The method of claim 1, further comprising determining, by the controller, whether an engine stop condition according to the current idle stop is satisfied, and stopping the engine by the controller according to the current idle stop when the engine stop condition is satisfied and the estimated disk temperature is lower than or equal to the first predetermined temperature.

6. The method of claim 5, wherein when the estimated disk temperature is higher than the first predetermined temperature, the engine stop according to the current idle stop is prohibited.

7. The method of claim 6, wherein when the estimated disk temperature is lower than or equal to a second predetermined temperature, the estimating the disk temperature is repeated.

8. The method of claim 7, wherein when the estimated disk temperature is higher than the second predetermined temperature, the engine stop according to the current idle stop is continuously prohibited.

9. The method of claim 5, further comprising:
    determining whether an engine restart condition is satisfied after the engine is stopped; and
    restarting the engine when the engine restart condition is satisfied.

10. The method of claim 9, further comprising:
    determining whether an operation of an electric brake system is needed when the engine is restarted; and
    operating the electric brake system when the operation of the electric brake system is needed.

11. The method of claim 10, wherein the operated electric brake system is released when a predetermined condition is satisfied.

* * * * *